United States Patent [19]

Ball

[11] Patent Number: 5,672,273
[45] Date of Patent: Sep. 30, 1997

[54] IN-LINE FILTER WITH FLANGE SEAL

[75] Inventor: Keith R. Ball, Piscataway, N.J.

[73] Assignee: Technical Fabricators, Inc., Piscataway, N.J.

[21] Appl. No.: 365,066

[22] Filed: Dec. 28, 1994

Related U.S. Application Data

[63] Continuation of Ser. No. 57,712, May 4, 1993, abandoned.

[51] Int. Cl.$^6$ ................................. B01D 35/02
[52] U.S. Cl. .................. 210/448; 210/450; 210/452; 210/461; 55/361; 55/377; 55/379; 55/481
[58] Field of Search .................. 55/361, 374, 376, 55/377, 378, 379, 381, 382; 210/448, 452, 450, 445, 461

[56] References Cited

U.S. PATENT DOCUMENTS

| | | | |
|---|---|---|---|
| 4,220,459 | 9/1980 | Hammond et al. | 55/377 |
| 4,244,718 | 1/1981 | Noddin | 55/377 |
| 4,251,244 | 2/1981 | Evenstad | 55/379 |
| 4,270,935 | 6/1981 | Reinauer | 55/379 |
| 4,304,579 | 12/1981 | Granville et al. | 55/381 |
| 4,333,893 | 6/1982 | Clyde . | |
| 4,377,401 | 3/1983 | Laughlin . | |
| 4,435,197 | 3/1984 | Nijhawan et al. | 55/379 |
| 5,039,410 | 8/1991 | Gershenson | 210/232 |
| 5,173,098 | 12/1992 | Pipkorn | 55/379 |
| 5,188,731 | 2/1993 | Lapoint, Jr. | 210/232 |
| 5,202,021 | 4/1993 | Griffin et al. | 55/376 |

FOREIGN PATENT DOCUMENTS

| | | |
|---|---|---|
| 0202725 A2 | 11/1986 | European Pat. Off. . |
| 966235 | 8/1964 | United Kingdom . |
| 1549170 | 7/1979 | United Kingdom . |

*Primary Examiner*—W. L. Walker
*Attorney, Agent, or Firm*—Rohm & Monsanto

[57] ABSTRACT

A filter arrangement which is employed in a fluid conduit is formed of a filter formed of a permeable filter material connected to a flange seal having an annular portion for engaging with and coupling to the permeable filter medium, and a planar portion for forming a seal which prevents leakage at a flange-type coupler. The planar and annular portions of the flange seal are formed of teflon, as is the filter itself, which may be formed of multiple layers of teflon fabric or filter material, each having a respective filter permeability characteristic. The filter is coupled to the annular portion of the flange seal by a thread which is sewn through the various layers of the filter medium and the annular portion of the flange seal. The thread may itself be formed of teflon, such that the entire filter arrangement is formed of teflon and will resist corrosion. Collapse of the filter is prevented by a rigid tubular support which has apertures therethrough to facilitate flow of the fluid. The rigid support is prevented from being driven from within the filter, and the filter becoming inverted, by operation of a tube sheet installed at a flange coupler of the fluid conduit, and which has a smaller aperture therethrough than the tubular support member.

14 Claims, 2 Drawing Sheets

IN-LINE FILTER WITH FLANGE SEAL

This application is a continuation, of application Ser. No. 08/057,712 filed on May 4, 1993, now abandoned.

BACKGROUND OF THE INVENTION

1. Field of the Invention

This invention relates generally to in-line filter systems, and more particularly, to a filter arrangement which is arranged within a flange-coupled fluid line and which seals a flanged fluid line coupling.

2. Description of the Related Art

Simplicity of structure and overall economy is achieved by using filter systems which are contained within a fluid conduit, without the need for a filter vessel. It is a problem with known in-line flange filters that they interfere with the fluid seal which is effected between the faces of respective flange portions of the fluid conduit. The result is that the fluid being filtered, which may be toxic and carcinogenic, leaks at a flange coupling, presenting a serious hazard to personnel and the environment.

It is a further problem with known in-line filters that they have a relatively short service life, requiring frequent removal of the filter for cleaning, replacement, or other maintenance. There is a need, therefore, for a filter arrangement which can be cleaned easily without removal from the fluid conduit. Such a reduction in the frequency of filter removal produces a corresponding reduction in the risk of contaminating personnel with corrosive, carcinogenic, or otherwise toxic fluid materials.

It is, therefore, an object of this invention to provide a filter arrangement which provides a filtering function while simultaneously sealing a flange coupling in a fluid line.

It is another object of this invention to provide a filter arrangement which does not require filter housing to be installed in a fluid line.

It is additionally an object of this invention to provide a filter arrangement which is installed within a conduit of the fluid being filtered, and which easily can be removed and replaced at a conventional flange coupling of the conduit.

It is yet a further object of this invention to provide a filter arrangement which can be operated in a compression mode, whereby it can provide a prolonged service life.

It is also an object of this invention to provide a filter arrangement which easily can be backwashed, and can remain for extended periods in service without the need for removal for un-installed maintenance.

It is a further object of this invention to provide a filter arrangement which is simple to manufacture and use.

It is also another object of this invention to provide a filter arrangement which is simple and convenient to install and replace.

It is yet an additional object of this invention to provide a filter arrangement which provides the advantages of high durability and a long service life.

It is still another object of this invention to provide a filter arrangement which provides the advantages of a high degree of resistance to corrosion.

It is a yet further object of this invention to provide a resin trap filter bag arrangement which is durable, can be backwashed, incorporates a flange seal, and requires only minimal maintenance.

It is also a further object of this invention to provide a filter arrangement which is held in place along a fluid conduit using only a conventional flange coupler arrangement.

SUMMARY OF THE INVENTION

The foregoing and other objects are achieved by this invention which provides a filter arrangement for use in a fluid conduit of the type which is provided with a flange coupling. In accordance with the invention, the filter arrangement is provided with a filter formed of a permeable filter medium which is configured in the form of a bag so as to have an open end and a closed end. A flange seal is formed of an impermeable resilient material having a substantially planar portion for forming a seal in the flanged coupling of the fluid conduit, and an annular portion for communicating with the open end of the filter. The annular portion of the flange seal and the filter are coupled to one another in a secure manner.

In one embodiment of the invention, the open end of the filter bag is engaged with the annular portion of the flange seal by a thread which is sewn through the permeable filter medium in the vicinity of the open first end of the filter, and the annular portion of the flange seal. In a preferred embodiment, the thread is made of teflon, or a similar material. In a further embodiment, a rigid support is employed in the filter to prevent collapse thereof during use, particularly in a compression mode, where fluid flow through the filter medium is from the exterior of the filter bag to the interior thereof. The rigid support may be in the form of a tube which may have apertures on the surface thereof to facilitate fluid flow.

The flange seal may be formed of two portions, which may be formed integrally with one another. The planar portion of the flange seal has a circular configuration, in this embodiment, and is further provided with a plurality of apertures therethrough for accommodating the bolts associated with the flange coupling of the fluid conduit. This planar portion may be formed of a thermoplastic material, but preferably is formed of teflon. Thus, the use of teflon thread to couple the filter to the annular portion of the flange seal, and the use of teflon to form the planar portion of the flange seal, results in a unit which is highly resistant to corrosion.

In one embodiment of the invention, the filter is formed of a permeable filter medium which is resilient and flexible as a web material. Such a resilient material tends to collapse onto itself when the filter arrangement is employed in the compression mode, where fluid flows from the exterior of the bag through the filter medium, and into the interior of the bag. Accordingly, there is provided in this embodiment a rigid support which prevents such collapse. In one highly practical embodiment, the rigid support is formed as a tubular member inserted into the filter bag, which tubular member has a multiplicity of apertures through the wall. Such apertures facilitate the flow of the fluid being filtered into the interior of the filter arrangement.

In one highly advantageous embodiment of the invention, the planar portion of the flange seal has a circular configuration which is dimensioned to conform to the dimensional characteristics of the flange coupling which is installed in the fluid conduit. The planar portion may further be provided with a plurality of apertures for accommodating therethrough a plurality of bolts which are employed to couple securely facing portions of the flange coupling. Thus, the planar portion of the flange seal is sandwiched between the facing portions of the flange coupling, and forms a fluid-proof seal therebetween. The flange seal may be formed of any of several thermoplastic materials. In one embodiment, the flange seal may be formed of polypropylene. However, in a preferred embodiment, the flange seal is formed of teflon. In addition, persons of skill in the art can determine a thickness for the flange seal which is suitable for the particular application. In some embodiments, the thickness may range from approximately between 1/16th of an inch to 1/4th of an inch, and preferably is approximately 5/32 of an inch.

In accordance with a further aspect of the invention, a filter arrangement for use in a fluid conduit of the type which is provided with a flange coupling employs a filter formed of a permeable filter medium and which is configured as a substantially tubular bag having an open first end and a closed second end. The bag is formed of at least one layer of a resilient, flexible web material. A flange seal is formed of an impermeable resilient material having a substantially planar portion for forming a seal in the flange coupling of the fluid conduit and an annular portion for communicating with the first end of the filter. Preferably, the planar and annular potions of the flanged seal are formed integrally with one another. In addition, there is provided a coupling for joining the first end of the filter with the annular portion of the flange seal.

In one embodiment of the invention, the filter is formed of a plurality layers of resilient, flexible web materials, each such layer having a respective filtration characteristic. In such an embodiment, each of the plurality of layers is coupled to the annular portion of the flange means by a coupling means which may be a thread sewn through the plurality of layers of resilient material and the annular portion of the flange seal.

BRIEF DESCRIPTION OF THE DRAWINGS

Comprehension of the invention is facilitated by reading the following detailed description, in conjunction with the annexed drawing, in which.

DETAILED DESCRIPTION

Figure 1:
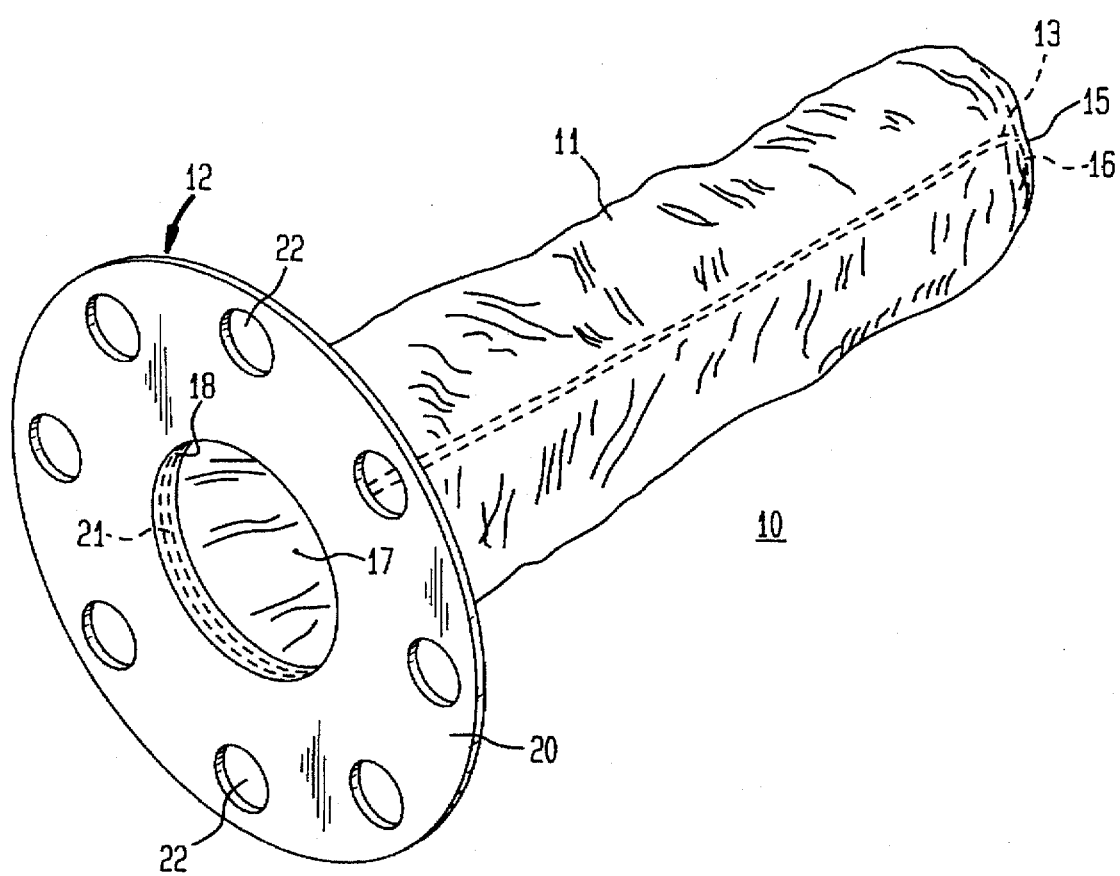
FIG. 1 is an isometric representation of a filter arrangement constructed in accordance with the principles of the invention.

FIG. 1 is a schematic representation of a specific illustrative embodiment of the invention. As shown, a filter arrangement 10 is provided with a filter portion 11 and a flange seal 12. As shown in the figure, filter portion 11 is formed of a web material which is sewn at a seam 13 to form a substantially tubular configuration. The right-most end of filter portion 11 is terminated with an end portion 15, which also may be formed of a filter material, and which is sewn to filter portion 11 at a further seam 16.

Flange seal 12 is formed of a substantially planar portion 20 and an annular portion 21. The open end 17 of filter portion 11 is securely coupled to annular portion 21 of flange seal 12 by coupling means which,in preferred embodiments, comprises stitches 18. In this specific illustrative embodiment, planar portion 20 and annular portion 21 are integrally formed. Also in this embodiment, the integrally formed planar and annular portions of the flange seal are composed of teflon. A plurality of apertures 22 are arranged through planar portion 20 for accommodating the through bolts (not shown in this figure) associated with the fluid line flange couplings, which will be described hereinbelow with respect to FIG. 2.

Referring once again to FIG. 1, filter portion 11 may, in certain embodiments, be formed of a plurality of layers of filter material. In an embodiment employing three layers, all of which are formed of teflon, an innermost layer is in the form of a teflon mesh for permitting drainage, a middle layer is a teflon-based filter medium, and an outer layer is a porous teflon fabric, which may be woven, so as to be characterized with high permeability. The outer layer provides a support for the teflon filter medium of the central layer, which is particularly useful during a back-flush operation whereby fluid is caused to flow from the interior of the filter arrangement to the exterior thereof. However, as previously stated, the fluid to be filtered generally will flow from the exterior of the filter to the interior thereof.

Figure 2:
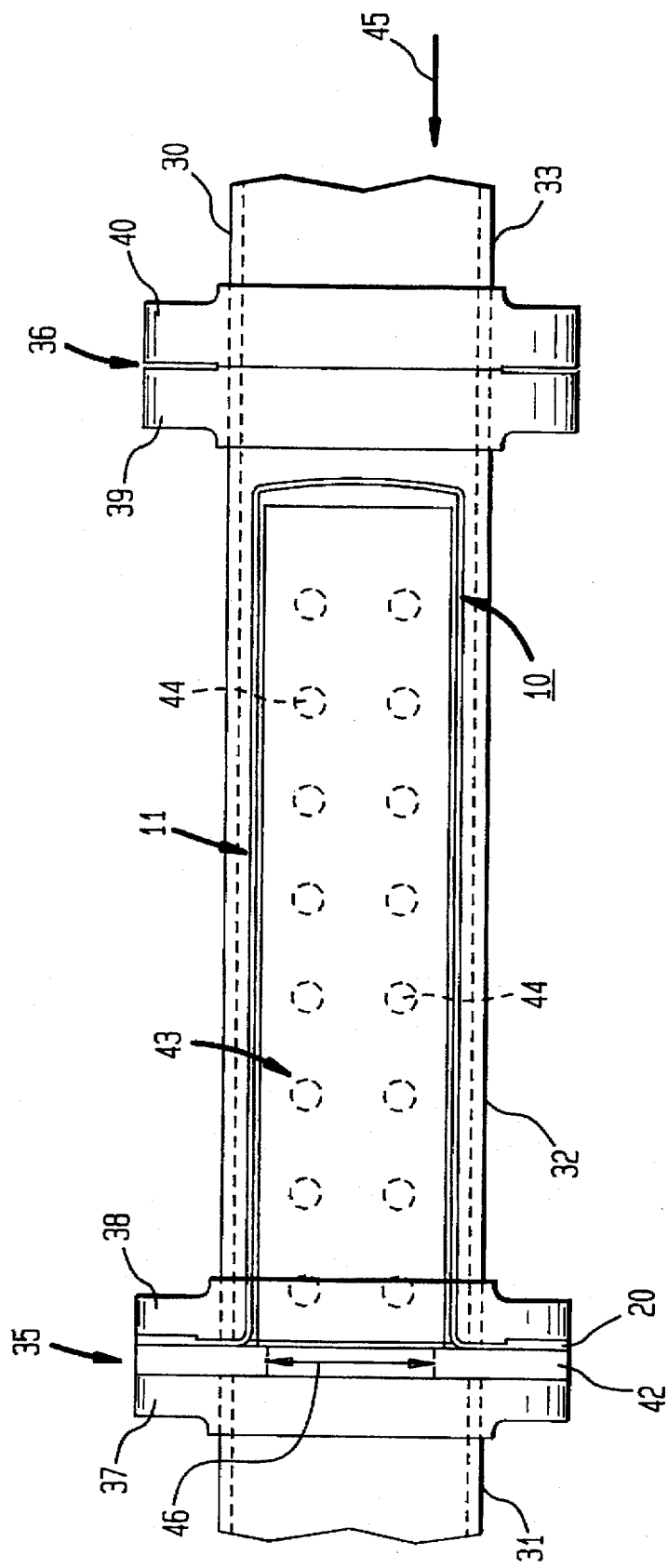
FIG. 2 is a cross-sectional schematic plan view of the embodiment of FIG. 1 installed in a fluid conduit and further showing a rigid support member for preventing collapse.

FIG. 2 is a partially cross-sectional plan view of filter arrangement 10 installed in a fluid conduit 30. In this embodiment, fluid conduit 30 is formed of three conduit sections 31, 32, and 33. The three conduit sections are coupled to each other via flange coupling units 35 and 36. Flange coupling unit 35 is formed of a flange coupling portion 37, which is fixed to conduit section 31, and a further flange coupling portion 38, which is fixed to conduit section 32. Similarly, flange coupling unit 36 is formed of a flange coupling portion 39, which is fixed to conduit section 32, and a further flange coupling portion 40, which is fixed to conduit section 33.

Referring to flange coupling unit 35, a tube sheet 42 is interposed between flange coupling portions 37 and 38, and also forms a sealing face for planar portion 20 of filter arrangement 10. A rigid support member in the form of a tube 43 is shown in cross-section. Tube 43 has a plurality of perforations 44 therethrough for permitting the fluid (not shown) to flow therethrough, as the fluid to be filtered flows along the direction of arrow 45.

In addition to forming a surface upon which planar portion 20 of the filter arrangement seals, tube sheet 42 has an interior diameter 46 which is smaller than the diameter of tube 43. Thus, the flow of fluid along the direction of arrow 45 will not cause filter portion 11 to invert, because tube 43 is precluded by tube sheet 42 from being moved toward the left in response to the pressures created by the moving fluid to be filtered.

During backwashing of the filter arrangement in the fluid conduit, fluid is caused to flow in the direction opposite to arrow 45. In a practical multi-layer embodiment of the invention, the outermost layer (not shown), which may be in the form of a woven teflon fabric, provides support for the lower permeability filter medium layer. This outer layer, therefore, prevents damage to the lower permeability layer caused by high backwash pressure.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A filter arrangement configured to be used in a fluid conduit of the type formed of first and second conduit portions, each such conduit portion being of the type which is provided with a respectively associated one of first and second flange coupling portions, each flange coupling portion being of the type having a plurality of apertures therethrough in a respective predetermined aperture arrangement whereby the apertures of the respective first and second flange coupling portions register with one another for accommodating a respective plurality of coupling bolts through the apertures in registration, the filter arrangement comprising:

a filter formed of a permeable filter medium configured as a bag having an open first end and a closed second end;

flange seal means formed of an impermeable resilient material for forming a compression gasket seal and a support for the filter, said flange seal means further having:

a planar sealing gasket portion for forming a seal between the first and second flange coupling portions of the fluid conduits, when the first and second flange coupling portions apply a compressive sealing force to said planar sealing gasket portion of said flange seal means, and an annular portion for communicating with said first end of said filter, said planar and annular portions being integrally formed, said substantially planar sealing gasket portion further being provided with a plurality of apertures therethrough arranged in the predetermined aperture arrangement; and coupling means for coupling said first end of said filter securely to said annular portion of said flange seal means, said coupling means being in the form of a thread sewn through said permeable filter medium in the vicinity of said open first end thereof and said annular portion of said flange seal means.

2. The filter arrangement of claim 1 wherein said flange seal means is formed of TEFLON.

3. The filter arrangement of claim 2 wherein said substantially planar portion of said flange seal means has a thickness of approximately between 1/16 and 1/4 of an inch.

4. The filter arrangement of claim 3 wherein said substantially planar portion of said flange seal means has a thickness of approximately 5/32 of an inch.

5. The filter arrangement of claim 1 wherein said permeable filter medium is a resilient, flexible web, and there is further provided rigid support means arranged in said filter for preventing collapse thereof.

6. The filter arrangement of claim 4 wherein there is further provided means for securing said rigid support means within said filter.

7. The filter arrangement of claim 1 wherein said thread is formed of TEFLON.

8. The filter arrangement of claim 1 wherein said flange seal means is formed of a thermoplastic material.

9. A filter arrangement configured to be used in a fluid conduit formed of first and second conduit portions, each such conduit portion being of the type which is provided with respectively associated one of first and second flange coupling portions for achieving a seal therebetween, the flange coupling portions having an aperture therethrough for accommodating a flange engagement member for urging the flange coupling portions toward one another, the filter arrangement comprising:

a filter formed of a permeable filter medium configured as a substantially tubular bag having an open first end and a closed second end, said bag being formed of at least one layer of a resilient, flexible web material;

flange seal means formed of an impermeable resilient material for forming a compression gasket seal and a support for the filter, said flange seal means further having:

a seal portion for forming a compression gasket seal directly between the flange coupling portions of the first and second fluid conduit portions, in response to a compressive sealing force applied to said seal portion when the first and second flange coupling portions are urged toward one another, said seal portion further forming a seal around the aperture for accommodating the flange engagement member, and an annular portion for communicating with said first end of said filter, said planar and annular portions being integrally formed with one another; and coupling means for coupling said first end of said filter securely to said annular portion of said flange seal means.

10. The filter arrangement of claim 9 wherein said filter is formed of a plurality of layers of resilient, flexible web materials, each such layer having a respective filtration characteristic.

11. The filter arrangement of claim 10 wherein each of said plurality of layers of resilient, flexible web materials, is coupled to said annular portion of said flange means by said coupling means.

12. The filter arrangement of claim 11 wherein there is further provided rigid support means arranged in said filter for preventing collapse of said plurality of layers of said web materials during use, said rigid support means having a tubular configuration.

13. The filter arrangement of claim 12 wherein there is further provided tube sheet means having an internal aperture having a diameter which is smaller than a diameter of said tubular configuration of said rigid support means for securing said rigid support means within said filter.

14. The filter arrangement of claim 9 wherein said flange seal means is formed of TEFLON.

* * * * *